United States Patent [19]
Strifler

[11] 3,731,168
[45] May 1, 1973

[54] BRAKE INSTALLATION FOR ELECTRICALLY DRIVEN VEHICLES

[75] Inventor: Paul E. Strifler, Dettingen, Teck, Germany

[73] Assignee: Daimler-Benz Aktiengesellschaft, Stuttgart-Unterturkheim, Germany

[22] Filed: Feb. 5, 1970

[21] Appl. No.: 8,970

[30] Foreign Application Priority Data

Feb. 5, 1969 Germany.....................P 19 05 641.8

[52] U.S. Cl..................................318/139, 318/371
[51] Int. Cl..............................................H02p 3/16
[58] Field of Search......................318/370, 371, 376, 318/139; 320/61

[56] References Cited

UNITED STATES PATENTS

| | | | |
|---|---|---|---|
| 3,546,548 | 12/1970 | Wouk | 318/139 |
| 3,530,356 | 9/1970 | Aronson | 320/61 |
| 3,488,570 | 1/1970 | Vint, Jr. et al | 318/371 |

Primary Examiner—Bernard A. Gilheany
Assistant Examiner—W. E. Duncanson, Jr.
Attorney—Craig, Antonelli, Stewart & HIill

[57] ABSTRACT

A brake installation for an electrically driven vehicle which includes mechanical brakes and utilizes the electric driving motor as electric brake by connecting it as generator, whereby the battery is recharged by this recovered energy; a control installation is provided which determines by way of a common brake lever, such as a brake pedal, the proportions in the over-all brake deceleration shared by the mechanical brakes and the electric brake.

14 Claims, 2 Drawing Figures

PATENTED MAY 1 1973
3,731,168
INVENTOR
PAUL E. STRIFLER
BY
Craig, Antonelli, Stewart & Hill
ATTORNEYS
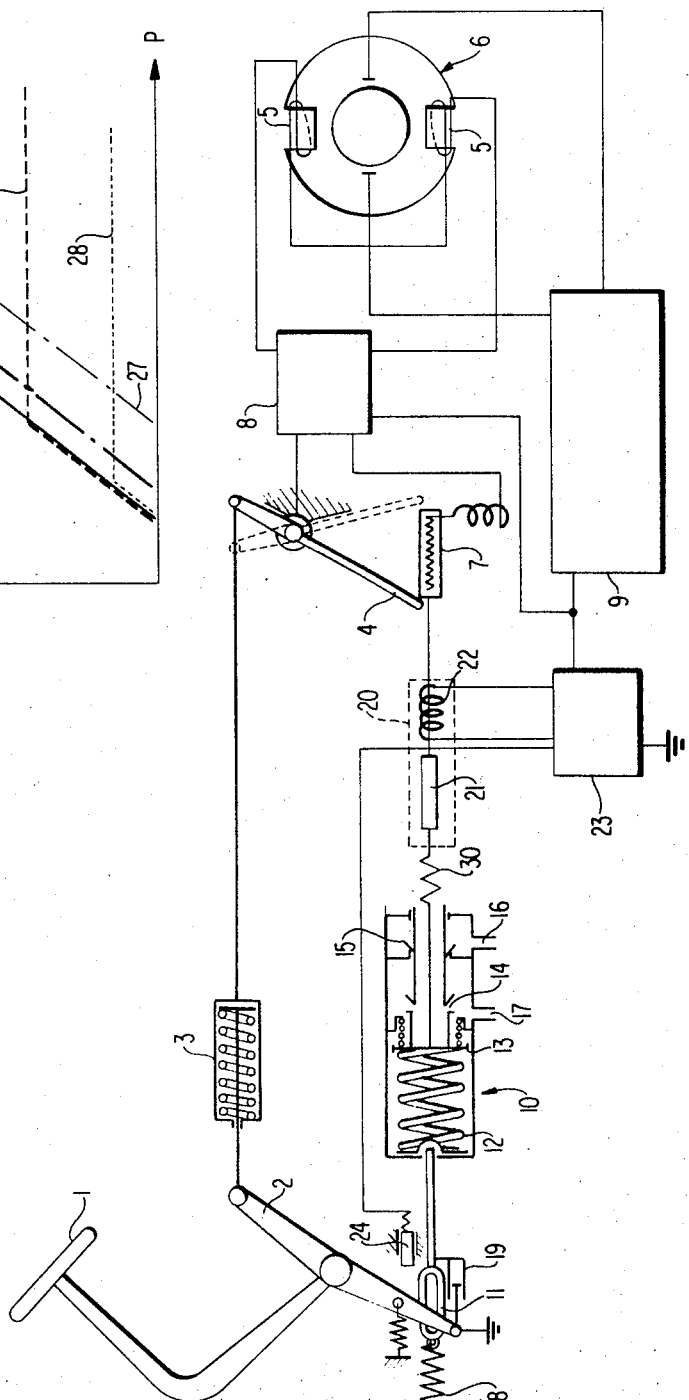

BRAKE INSTALLATION FOR ELECTRICALLY DRIVEN VEHICLES

The present invention relates to a brake installation for electrically driven vehicles which include a mechanical brake and an electric motor fed by a battery and adapted to be connected, for purposes of braking, as generator which supplies the energy thus recovered back to the battery.

Electrically driven vehicles can be electrically braked without wear in that the electric motor is driven by the vehicle during the braking and acts as generator. As a result thereof, on the one hand, the electric battery serving as energy source is recharged which leads to an enlargement of the radius of action whereas, on the other, the mechanical brakes prone to wear are saved so that the length of life thereof can be increased. Additionally, cold mechanical brakes are available for maximum braking effect in case of danger. However, limits are imposed on the recovery of energy by means of charging the battery by the respective charge condition of the battery. By reason of the gasing danger of the electrolyte of the battery, a predetermined voltage cannot be exceeded.

The present invention is concerned with the task to achieve with a vehicle of the aforementioned type, the largest possible proportion of the brake deceleration, necessary from a traffic point of view, electrically and to utilize the same for the purpose of recovery of energy. The present invention essentially consists in that a control installation is provided which in dependence on the charging condition of the battery determines the proportion of the mechanical brake and of the electric brake adapted to be engaged by a common brake lever in the over-all brake deceleration. The advantage results from this arrangement that the mechanical brake is far-reachingly saved and only the portion which under certain circumstances can no longer be braked electrically by reason of the charge condition of the battery, is left over to the mechanical brake.

In order to achieve that the driver does not notice anything of this change of the brake deceleration distribution and achieves a predetermined brake deceleration with each brake actuating force, it is appropriate if the control installation determines the proportional shares of the brakes in the overall deceleration in such a manner that independently of the distribution, a predetermined brake deceleration is coordinated to each position of the brake lever. It is achieved thereby that always the same overall brake deceleration is coordinated to each actuating force of the brake lever, for example, to the pedal force of a brake pedal.

A structurally appropriate type of construction of the present invention is obtained if the control installation adjusts a conventional brake valve of the mechanical brake and a control resistance arranged in the energizing circuit for the windings of the electric motor. An electromagnetic adjusting member may be provided thereby advantageously as control installation whose core or armature is connected with the brake valve and with the resistance and whose coil is connected to a control device producing a current in dependence on the charge condition and the temperature of the battery. Depending on the charging condition, the initial condition prior to the beginning or during a braking operation is determined by the core of the electromagnetic adjusting member depending on the charging condition, i.e., it is determined how strongly the common brake lever of the mechanical and of the electric brake acts on the associated brake valve and on the associated control resistance.

It is advantageous if, for the purpose of controlling the electric brake, the magnitude of the energization is adjustable by way of the brake lever at the control resistance of the energizing circuit. In order to achieve that during actuation of the brake lever, at first the electric brake starts to operate and only when the maximum possible brake deceleration for the electric brake dependent on the charging condition of the battery is exceeded, the mechanical brake is additionally engaged, the brake lever may be connected with the brake valve by way of a link, for example, a conventional lost-motion link, and may actuate the brake valve only after traversing a predetermined path which corresponds to the maximum electric brake deceleration dependent on the charging condition of the battery. In order to have the full brake deceleration immediately available nonetheless in case of danger, a damping element may be built into the link which bridges or by-passes the link during rapid actuation of the brake lever. This damping element which does not become operative during the normal brake operation, brings about that during a sudden actuation of the brake lever, the complete brake deceleration of the mechanical brake is available immediately.

Accordingly, it is an object of the present invention to provide a brake installation for electrically driven vehicles which avoids by simple means the aforementioned shortcomings and drawbacks encountered in the prior art.

Another object of the present invention resides in a brake installation for electrically driven vehicles which maximizes the use of the electric motor as electric brake for purposes of re-charging the electric battery without endangering the battery by excessive charging voltages.

A further object of the present invention resides in a brake installation for electrically driven vehicles in which a predetermined brake deceleration is coordinated to each brake actuating force regardless of the distribution of the proportion of the brake deceleration shared by the electric and mechanical brakes.

Still a further object of the present invention resides in a brake installation for electrically driven cars of the type described above which is extremely reliable in operation, assures maximum safety, and makes available the entire mechanical brake deceleration in case of emergency.

These and further objects, features, and advantages of the present invention will become more obvious from the following description which shows for purposes of illustration only, one embodiment in accordance with the present invention, and wherein:

FIG. 1 is a schematic view of a brake installation according to the present invention of an electrically driven vehicle; and FIG. 2 is a diagram representing the overall (entire) brake deceleration in dependence on the actuating force.

Referring now to the drawing and more particularly to FIG. 1, an electric and a mechanical brake are simultaneously actuated by a common brake lever, in the illustrated embodiment by a brake pedal 1. A double-lever 2 is connected with the brake pedal 1 which is pivotally connected by way of a spring link 3 with a lever 4 of the electric brake. Upon actuation of the brake pedal 1, the lever 4 of the electric brake sweeps over a control resistance 7 arranged in the energizing circuit for the windings 5 of the electric motor 6 of the vehicle so that with increasing pedal path and therewith with increasing pedal force an increasing current is supplied by way of the energizing control 8 to the windings 5 of the electric motor 6. Since this electric motor 6 during braking acts as generator, the brake effect is increased on the one hand, with a continuing pedal path, whereas, on the other, the produced energy returned to the battery 9 of the electric motor also increases.

The second arm of the double lever 2 connected with the brake pedal 1 acts on a conventional brake valve generally designated by reference numeral 10. The connection of this lever arm 2 with the brake valve 10 takes place by way of a link 11 which is so dimensioned that an actuation of the brake valve 10 takes place only when, as a result of a further depressing of the brake pedal 1, a higher brake deceleration is desired than can be supplied by the electric brake. When the end of the guide link 11, in the form of a lost-motion connection with an elongated aperture cooperating with a pin is reached, at first the piston 13 of a relief valve 14 is closed by way of a spring 12 of the brake valve 10, and only thereafter the control valve 15 is forced off its seat in order that the air can from the reservoir tank (not shown) reach by way of the inlet 16 and by way of the outlet 17 the wheel brake cylinders (not shown). This pressure acts in a conventional manner also on the back side of the piston 13 so that a brake pressure corresponding to the pedal pressure or to the stress of the spring 12 is being built up in the wheel cylinders. A return spring 18 retains the link 11 in its end position. In order to have the maximum possible brake deceleration instantaneously available in case of danger, a damping element 19 is built into the link 11 which during a rapid depressing of the brake pedal 1 bridges or by-passes the linkage 11 and actuates instantaneously the brake valve 10. During the normal velocities, however, this damping element 19 is without influence for the actuation of the brake pedal 1.

In order to prevent that the battery 9 in the course of a braking operation is charged above the gasing voltage with the largest possible electric brake deceleration or heats up too strongly, a control installation is provided which then changes the distribution of the proportions of the mechanical brake and of the electric brake in the overall brake deceleration, however, without changing the value of the overall brake deceleration. For that purpose, an electromagnetic adjusting member 20 is provided, to the core 21 of which is connected, on the one hand, the piston 13 of the brake valve 10 by way of a spring 30, and, on the other, the electric control resistance 7 of the energizing circuit of the windings 5 of the electric motor 6. The coil 22 of the electromagnetic adjusting member 20 is connected with a conventional control device 23 which operates in dependence on the charging voltage and on the temperature of the battery 9 and produces current for the electromagnetic adjusting member 20. This, however, takes place only when the mechanical brake is actuated, i.e., when the contact 24 arranged within the area of the double-lever 2 is closed.

The electromagnetic adjusting member 20 then displaces toward the right — as viewed in the drawing — on the one hand, the control resistance 7, whereby the energizing current for the electric motor 6 is decreased. As a result thereof, the electric deceleration is reduced to such an extent that an acceptable value for the charging condition of the battery is achieved. However, since the overall brake deceleration is not to be changed, the piston 13 of the brake valve 10 is simultaneously displaced also toward the right — as viewed in the drawing — so that an assist of the force of the spring 12 results. As a result of the displacement of the piston 13, the pressure at the wheel brake cylinders is increased by way of the control valve 15 until the back-pressure at the back-side of the piston 13 is in equilibrium with the increased pressure which is composed of the pressure of the spring 12 and of the force of the electromagnetic adjusting member 20. The effect is thereby the same as if the driver would actuate more strongly the mechanical brakes.

In FIG. 2, the overall brake deceleration $b$ is plotted in a diagram against brake pedal force P. The brake installation will be so dimensioned, especially by a matching of the springs 12 and 18, that a brake characteristic corresponding to the full line is achieved as brake deceleration 25. This full line is composed, on the one hand, of the brake deceleration 26 shown in dash line of the electric brake and, on the other, of the brake deceleration 27 shown in dash and dot line of the mechanical brake. In the normal case, i.e., as long as the control installation dependent on the battery 9 does not respond, the overall brake deceleration 25 results as a composition of the lines 26 and 27. At first, only the electric brake is thereby engaged which can increase up to a maximum deceleration by a change of the control resistance. This maximum value is determined by the output of the electric motor 6 operating as generator. Only thereafter the mechanical brake is additionally engaged, in case a higher brake deceleration becomes necessary during the drive. This trailing of the mechanical brake is achieved by the linkage 11 in the actuating mechanism of the brake valve 10. The link 11 is thereby so selected that the overall brake deceleration 25 illustrated in full line is achieved.

If the charging condition of the battery 9 no longer permits that the battery 9 is charged with the full output of the electric motor 6 acting as generator, then the control device 23 engages by way of the electromagnetic adjusting member 20 in such a manner that by the displacement of the control resistance 7, the maximum electric deceleration is limited to a lower value, for example, to the value 28 illustrated in short dash lines. Simultaneously therewith, however, the mechanical brake is engaged earlier by way of the electromagnetic adjusting member 20, i.e., the beginning of the mechanical braking is displaced to the line 29 illustrated in dash and dot lines because the brake valve 10 is actuated already by the electromagnetic adjusting member 20. The matching is thereby made in such a manner that again the overall brake deceleration 25 illustrated in full line is achieved so that always an identical overall brake deceleration 25 is coordinated to each pedal path or each pedal force independently of how the proportions of the overall deceleration 25 are distributed to the mechanical brake and to the electric brake.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A brake installation for electrically driven vehicles which includes a mechanical brake and an electric motor operable to be connected as a generator for braking purposes as an electric brake and fed by a battery, and in which the electric motor operating as a generator re-supplies the energy recovered during braking to the battery, characterized in that a detecting means is provided for detecting the charging condition of the battery and providing a signal indicative thereof, and a control means is provided which is responsive to the detecting means and which determines in dependence on the charging condition of the battery the proportional shares of the mechanical brake and of the electric brake in the overall brake deceleration.

2. A brake installation according to claim 1, characterized in that said control means includes a common brake lever.

3. A brake installation according to claim 1, characterized in that the mechanical brake includes brake valve means, in that a control resistance means is operatively connected with the energizing circuit for the windings of the electric motor, and in that the control means is operable to adjust the brake valve means and the control resistance means.

4. A brake installation according to claim 3, characterized in that an electromagnetic adjusting member is provided in the control means whose core is operatively connected with the brake valve means by way of a spring and with the control resistance means, and whose control winding is operatively connected with the detecting means which produces a current in dependence on the charging condition and on the temperature of the battery.

5. A brake installation according to claim 3, characterized in that the magnitude of the energization of the windings of the electric motor is adjustable by way of the brake lever at the control resistance means of the energizing circuit.

6. A brake installation according to claim 3, characterized in that the brake lever is operatively connected with the brake valve means by way of a link means and actuates the brake valve means only after traversing a predetermined path which corresponds to the maximum electric brake deceleration dependent on the charging condition of the battery.

7. A brake installation according to claim 6, wherein said link means includes damping means which by-passes the link means during rapid actuation of the brake lever.

8. A brake installation for electrically driven vehicles which includes a mechanical brake and an electric motor operable to be connected as a generator for braking purposes as an electric brake and fed by a battery, and in which the electric motor operating as a generator re-supplies the energy recovered during braking to the battery, characterized in that a control means is provided which determines in dependence on the charging condition of the battery the proportional shares of the mechanical brake and of the electric brake in the overall brake deceleration, said control means including a common brake lever, the control means determining the proportional shares of the brakes in the overall brake deceleration in such a manner that independently of the distribution, a predetermined brake deceleration is coordinated to each position of the brake lever.

9. A brake installation according to claim 8, characterized in that the mechanical brake includes brake valve means, in that a control resistance means is operatively connected with the energizing circuit for the windings of the electric motor, and in that the control means is operable to adjust the brake valve means and the control resistance means.

10. A brake installation according to claim 9, characterized in that an electromagnetic adjusting member is provided in the control means whose core is operatively connected with the brake valve means by way of a spring and with the control resistance means, and whose control winding is operatively connected with a control device producing a current in dependence on the charging condition and on the temperature of the battery.

11. A brake installation according to claim 10, characterized in that the magnitude of the energization of the windings of the electric motor is adjustable by way of the brake lever at the control resistance means of the energizing circuit.

12. A brake installation according to claim 11, characterized in that the brake lever is operatively connected with the brake valve means by way of a link means and actuates the brake valve means only after traversing a predetermined path which corresponds to the maximum electric brake deceleration dependent on the charging condition of the battery.

13. A brake installation according to claim 12, wherein said link means includes damping means which by-passes the link means during rapid actuation of the brake lever.

14. A brake installation for electrically driven vehicles which includes a mechanical brake and an electric motor operable to be connected as a generator for braking purposes as an electric brake and fed by a battery, and in which the electric motor operating as a generator re-supplies the energy recovered during braking to the battery, characterized in that a control means is provided which determines in dependence on the charging condition of the battery the proportional shares of the mechanical brake and of the electric brake in the overall brake deceleration, the control means determining the proportional shares of the brakes in the overall brake deceleration in such a manner that independently of the distribution, a predetermined brake deceleration is coordinated to each position of the brake lever.

* * * * *